US012589670B2

(12) United States Patent
Wechlin

(10) Patent No.: US 12,589,670 B2
(45) Date of Patent: Mar. 31, 2026

(54) DEVICE AND METHOD FOR INDUCTIVELY TRANSMITTING ELECTRICAL ENERGY TO A WATERCRAFT AND CHARGING SYSTEM

(71) Applicant: ENRX IPT GmbH, Efringen-Kirchen (DE)

(72) Inventor: Mathias Wechlin, Kandern (DE)

(73) Assignee: ENRX IPT GmbH, Efringen-Kirchen (DE)

( * ) Notice: Subject to any disclaimer, the term of this patent is extended or adjusted under 35 U.S.C. 154(b) by 674 days.

(21) Appl. No.: 17/925,727

(22) PCT Filed: May 6, 2021

(86) PCT No.: PCT/EP2021/061954
§ 371 (c)(1),
(2) Date: Nov. 16, 2022

(87) PCT Pub. No.: WO2021/244818
PCT Pub. Date: Dec. 9, 2021

(65) Prior Publication Data
US 2023/0191925 A1       Jun. 22, 2023

(30) Foreign Application Priority Data

May 20, 2020    (DE) ..................... 10 2020 113 744.3

(51) Int. Cl.
*B60L 53/38*          (2019.01)
*B60L 53/12*          (2019.01)
(Continued)

(52) U.S. Cl.
CPC ............... *B60L 53/38* (2019.02); *B60L 53/12* (2019.02); *B60L 53/126* (2019.02); (Continued)

(58) Field of Classification Search
CPC ...... B60L 53/12; B60L 2200/32; B60L 53/38; B60L 53/126; B60L 53/35; Y02T 90/12; B63J 2003/043
See application file for complete search history.

(56) References Cited

U.S. PATENT DOCUMENTS 6,257,162 B1 * 7/2001 Watt ....................... B63G 8/001
                                                       114/221 R
9,742,202 B2    8/2017 Nizuma
                       (Continued)

FOREIGN PATENT DOCUMENTS

CN        107826222 A     3/2018
DE    102011108543 A9 *   4/2012   ........... B60L 53/126
                       (Continued)

OTHER PUBLICATIONS

Search Report dated May 28, 2019, in connection with GB1819708.
7, filed Dec. 3, 2018.
                       (Continued)

*Primary Examiner* — Cheng Lin
(74) *Attorney, Agent, or Firm* — Fleit Intellectual Property Law; Paul D. Bianco; Katharine Davis Wong

(57)          ABSTRACT
A device for inductively transmitting electrical energy between a power supply unit arranged on the shore of a body of water or in the body of water and a watercraft includes a primary coil associated with the power supply unit, and a secondary coil which is connectable to the primary coil for inductively transmitting electrical energy, and which is arrangeable on the watercraft. A height-adjustment device connected to the primary coil is provided in order to hold the primary coil at a consistent vertical distance from a water surface in a vertical direction running in the direction of the buoyancy. A corresponding charging system and method includes: aligning the coils relative to one another; previously or simultaneously adjusting a vertical distance
(Continued)

between the primary coil and water surface by with a height-adjustment device; inductively transmitting electrical energy between the coils.

15 Claims, 3 Drawing Sheets

(51) Int. Cl.
   *B60L 53/126* (2019.01)
   *B63J 3/04* (2006.01)
(52) U.S. Cl.
   CPC ...... *B60L 2200/32* (2013.01); *B63J 2003/043*
   (2013.01); *Y02T 90/12* (2013.01)

(56) References Cited

U.S. PATENT DOCUMENTS

| | | | |
|---|---|---|---|
| 10,059,419 B2 | 8/2018 | Glueckhardt | |
| 10,230,243 B2 | 3/2019 | Schatz | |
| 11,951,848 B2 | 4/2024 | Curran | |
| 2010/0272517 A1 | 10/2010 | Montgomery | |
| 2014/0375140 A1* | 12/2014 | Niizuma | B60L 53/38 |
| | | | 307/104 |
| 2015/0002092 A1* | 1/2015 | Niizuma | B60L 53/51 |
| | | | 320/108 |
| 2017/0077759 A1* | 3/2017 | Niizuma | B60L 5/005 |
| 2021/0394625 A1* | 12/2021 | Curran | B60L 53/38 |
| 2021/0394633 A1* | 12/2021 | Curran | B60L 53/12 |

FOREIGN PATENT DOCUMENTS

| | | | | |
|---|---|---|---|---|
| FR | 2781755 A1 | 2/2000 | | |
| GB | 2458476 A | 9/2009 | | |
| GB | 2508923 A | 6/2014 | | |
| GB | 2512864 A | 10/2014 | | |
| GB | 2517679 A | 3/2015 | | |
| JP | H091 02329 A | 4/1997 | | |
| JP | 200092615 | 3/2000 | | |
| JP | 2004022779 A | 1/2004 | | |
| JP | 2010011696 A | 1/2010 | | |
| JP | 2011193616 A | 9/2011 | | |
| KR | 10-2011-0035357 | 4/2011 | | |
| KR | 10-1596923 B1 | 2/2016 | | |
| KR | 101596923 A | 2/2016 | | |
| WO | 2013/154131 | 10/2013 | | |
| WO | WO-2016121089 A1 * | 8/2016 | ............. | B63J 99/00 |
| WO | WO-2016140239 A1 * | 9/2016 | ............. | B60L 53/12 |
| WO | WO-2017125153 A1 * | 7/2017 | ............. | H02J 50/90 |
| WO | 2017/209735 A1 | 12/2017 | | |

OTHER PUBLICATIONS

Office Action dated Apr. 5, 2024 for European Patent Application No. 21 725 716.1.

Search Report dated May 21, 2019, in connection with GB1819707. 9, filed Dec. 3, 2018.

International Search Report and Written Opinion for PCT/EP2019/ 83540, filed Dec. 3, 2019.

International Preliminary Report on Patentability dated Nov. 17, 2022 and Written Opinion for PCT/EP2021/061954, filed May 6, 2021.

International Search Report and Written Opinion for PCT/EP2021/ 061954, filed May 6, 2021.

* cited by examiner

DEVICE AND METHOD FOR INDUCTIVELY TRANSMITTING ELECTRICAL ENERGY TO A WATERCRAFT AND CHARGING SYSTEM

FIELD OF THE INVENTION

The present invention relates to a device for inductively transmitting electrical energy between a power supply unit arranged on the shore of a body of water or in the body of water and a watercraft that can be moved relative to the shore, a charging system, and a method for inductively transmitting electrical energy between the charging station and the watercraft.

BACKGROUND

A charging device for charging batteries on board a boat, a ship, or a seagoing vessel is known from WO 2017/125153 A1, which comprises a member that can extend over an edge of a dock, a quay or a pontoon. The member carries a support structure comprising both means for releasably locking it to the boat, ship or seagoing vessel and a primary coil which can be brought into operative connection with a secondary coil in the hull of the vessel. However, this requires a complex support structure, and, furthermore, both the means for releasably locking it to the boat, ship or seagoing vessel and the primary coil must be constantly repositioned with respect to the different water levels caused by, on the one hand, relatively small fluctuations, e.g., due to the swell of waves of the body of water, and, on the other hand, the differences in the water levels, e.g., due to the tides or high or low water. This usually requires sufficient time to establish the connection between the charging device and the boat, ship or seagoing vessel, and is therefore generally only considered for prolonged charging, for example, when the boat, ship or seagoing vessel remains in port or a repair dock for an extended period of time. Moreover, the solution of this problem is technically complex.

However, especially in the field of ferry operations with smaller and medium-sized watercraft, which dock at a shore or quay at short intervals throughout the day, and then only for a short time to disembark or board a few passengers and/or cargo, it is desirable to charge the batteries or accumulators present on the watercraft as often as possible but quickly and within the short docking period.

SUMMARY

Thus, one problem the present invention addresses is to make available a device and a method for inductively transmitting electrical energy to a watercraft, which overcome the above-mentioned disadvantages, and to make possible a simple and quick inductive transmission of electrical energy between a watercraft and a charging station on a shore of a body of water, independently of the water level.

This problem is solved by the present invention by means of a device for inductively transmitting electrical energy between a power supply unit arranged on the shore of a body of water or in the body of water and a watercraft that can be moved relative to the shore as disclosed herein, a charging system as disclosed herein, and a method for inductively transmitting electrical energy between a power supply unit arranged on the shore of a body of water or in the body of water and a watercraft that can be moved relative to the shore as disclosed herein. Further advantageous refinements and preferred embodiments of the invention are also disclosed herein.

According to the present invention, an above-mentioned device for inductively transmitting electrical energy between a power supply unit arranged on the shore of a body of water or in the body of water and a watercraft that can be moved relative to the shore is characterized in that a height adjustment device connected to the primary coil is provided in order to maintain the primary coil at a constant vertical distance from a water surface in the vertical direction extending in the direction of the buoyancy.

Preferably, the vertical distance between the water surface and the primary coil can be adjusted by means of a height adjustment device.

The height adjustment device can include a float that is connected to the primary coil. The distance between the float and the primary coil can advantageously be adjusted in the vertical direction. The float can further advantageously be connected to the primary coil by means of a connecting element, the length of which can be adjusted in the vertical direction. Preferably, the buoyancy characteristics of the float can be changed. The float can be connected to the bed of the body of water or to the shore by means of a tensioning element, the length of which is adjustable. The tensioning element can be reeled in by means of a retraction device.

In addition, the device may include an inclination adjustment device for adjusting the inclination of the primary coil.

The primary coil can preferably be mounted so as to be movable in the vertical direction by means of a height-adjustable mounting device on the shore.

According to the present invention, an above-mentioned charging system is characterized in that a height adjustment device connected to the primary coil is provided in order to maintain the primary coil at a constant vertical distance from a water surface in the vertical direction extending in the direction of buoyancy. The device for inductively transmitting electrical energy of the charging system can thus be configured as described above and in the following.

According to the present invention, an above-described method for inductively transmitting electrical energy between a power supply unit arranged on the shore of a body of water or in the body of water and a watercraft that can be moved relative to the shore is characterized by the steps: a) aligning the two coils with respect to each other, b) previously or simultaneously adjusting a vertical distance between the primary coil and a water surface by means of a height adjustment device, and c) inductively transmitting electrical energy between the primary coil and the secondary coil. The adjustment in step b) can preferably be performed as a function of the draft of the watercraft. In addition, when the draft of the watercraft changes, the vertical distance of the primary coil from the water surface can be made to conform to the change of the draft by means of the height adjustment device.

BRIEF DESCRIPTION OF THE DRAWINGS

Additional features and advantages of the present invention follow from the description of preferred embodiment examples below with reference to the drawings. The drawings show.

DETAILED DESCRIPTION

Figure 1:
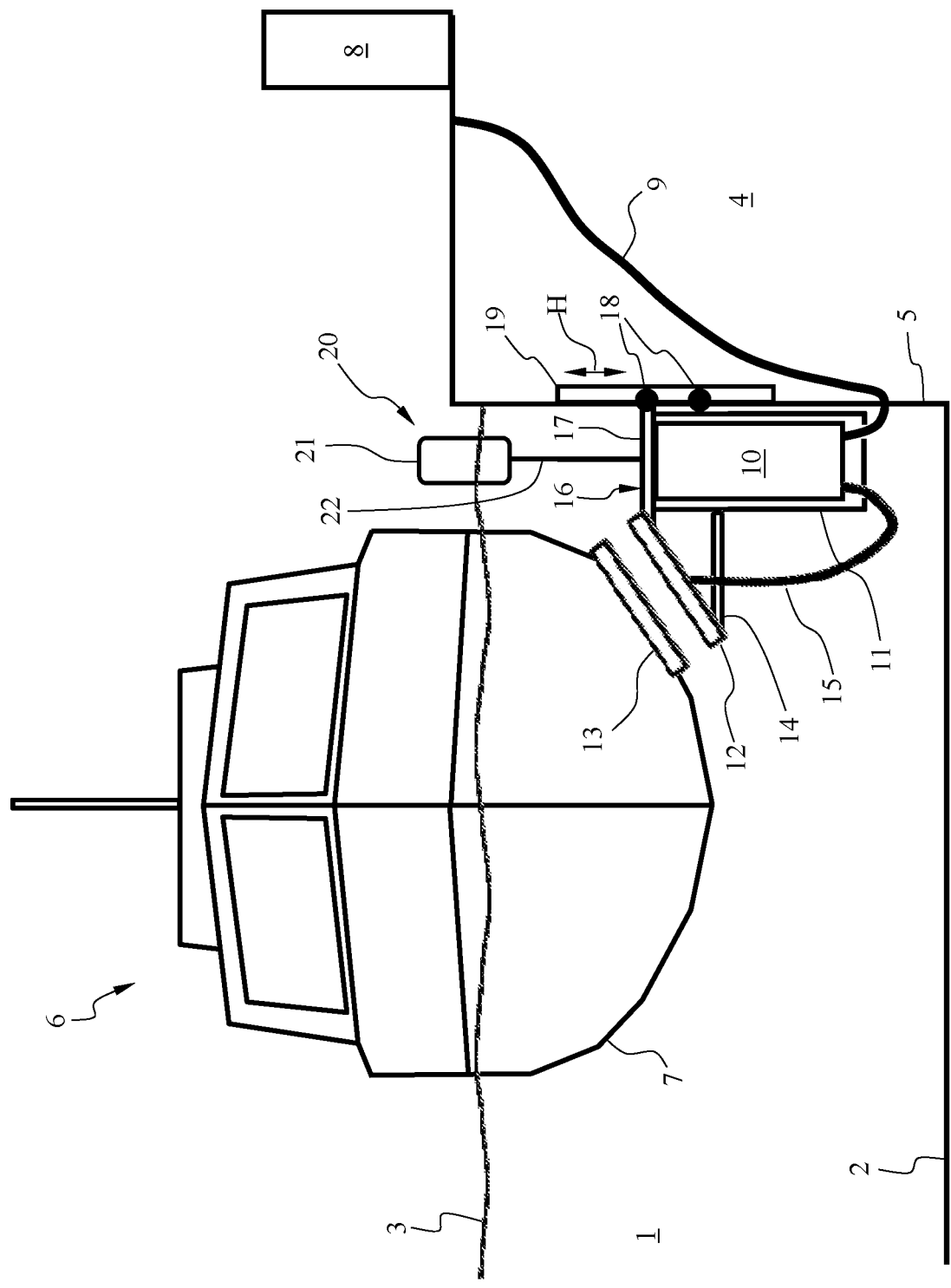
FIG. 1 a diagrammatic front view of a charging system according to the invention with a device according to the invention for inductively transmitting electrical energy between a charging station arranged on the shore of a body of water and a watercraft that can be moved relative to the shore.

FIG. 1 shows a body of water 1 having a bed 2 and a water surface 3 with a specific swell of waves, which may be a standing body of water such as a lake or a sea, or a flowing body of water, such as a river. The body of water 1 is shown in the area of a shore, in this case a docking place 4. The docking place 4 has a floor disposed slightly above the water surface 3 and, in the configuration shown, a fortified, vertically extending shore wall 5 which reaches from the floor to the bed 2 of the body of water and lies predominantly beneath the water surface 3. However, the shore wall can also run obliquely to a certain extent, but preferably at an angle of no more than 30° to the vertical.

Floating in the body of water 1 is a motor-driven watercraft 6 for passengers, which is moored at the docking place 4 and is preferably held in a stationary or essentially stationary position relative to the docking place 4, for example, in that the watercraft 6 is moored to the docking place 4 and thus can slightly move only within the range defined by the mooring. However, instead of a watercraft for passengers, the watercraft can also be a watercraft for land vehicles, a barge, a cargo ship, etc. The watercraft 6 shown, as seen from the bow, has a hull 7 with a known hull shape, which extends beneath the water surface 3 with a certain draft.

The above-described configuration is generally known to the person skilled in the art and requires no further explanation.

In the present case, however, a charging system according to the invention, which will be described in greater detail below, is additionally provided at the docking place 4. For this purpose, a commercial power supply 8 to which electrical energy can be supplied from a utility grid is provided at the docking place 4. The utility grid can be an isolated network or supply power to only a small area of the docking place 4, or it can be a large-area utility grid with a large number of feed-in points.

The commercial power supply 8 supplies electrical energy to a power supply unit 10 of the charging system according to the invention by means of a power supply cable 9.

The power supply unit 10 is in turn connected via a charging cable 15 to a first coil 12 for inductively transmitting electrical energy to a second coil 13 disposed on the underside of the hull 7. The first coil 12 serves as the primary coil, and the second coil 13 serves as the secondary coil. The second coil 13 is connected via a not-shown connection to the electrical on-board system of the watercraft 6, which has an electrical energy storage unit, also not shown. Depending on the application and size of the energy storage unit, this unit serves to supply electrical energy to parts of or the entire electrical on-board system of the watercraft 6. If the watercraft 6 has an electrical propulsion system or an auxiliary electrical propulsion system, this system can also be supplied with electrical energy by means of the energy storage unit.

The power supply unit 10 is used to transform the electrical energy provided from the commercial power supply 8 for supplying the first coil 12 in order to inductively transmit electrical energy to the secondary coil 13 by known means. If necessary, the power supply unit 10 can also be connected directly to the power grid without interconnection to the commercial power supply 8, in which case the electrical energy provided from the power grid must be transformed for supplying the first coil 12.

Thus, the coils 12, 13 form the essential components of a device according to the invention for inductively transmitting electrical energy between the charging station arranged on the shore 4 of the body of water 1 and the watercraft 6, which can be moved relative to the shore 4. The specific design of such an inductive energy transmission between two coils 12, 13 is known to the person skilled in the art and requires no further explanation.

The first coil 12 is disposed on a side wall 11 of a protective housing 16 of the power supply unit 10 by means of a mounting frame 14. The side wall 11 completely encloses the power supply unit 10 and, on its lower side, projects beyond the power supply unit 10 downwardly towards the bed 2 of the body of water. On its upper side facing in the vertical direction, the side wall 11 is airtightly connected to an upper cover 17. On its lower side facing the bed 2 of the body of water 1, the protective housing 16 is open-bottomed and, based on the diving bell principle, any air present in the protective housing 16 prevents the entry of water into the inside of the protective housing 16 and thus into the power supply unit 10. However, in an alternative configuration, the protective housing 16 can also be completely sealed against the entry of water. Optionally, the housing of the power supply unit 10 as such can serve as the protective housing 16, in which case the housing of the power supply unit is constructed to be impermeable to water.

In the present case, the protective housing 16 is mounted on the shore wall 5 by means of a roller arrangement 18 consisting of two rollers 18 so as to be movable in the height direction H along a linear guide 19 disposed on the shore wall. Movement in a plane perpendicular to the height direction H is prevented insofar as possible, although a certain amount of play within may be possible narrow limits. The linear guide 19 can be formed, for example, by two U-sections disposed at a distance from one another, the open sides of which are facing one another, so that a roller in each U-section is able to rotate about a horizontal axle. Thus, the two rollers are disposed on the opposite ends of a T-shaped—as seen from above—axle bearing, the center rod of which is attached to the housing. Other linear guides which allow a movement in the height direction H are also conceivable and readily known to those skilled in the art.

Electrical energy supply is understood to mean supply with electrical energy at higher power, which serves to charge energy storage units of the watercraft, which in turn serve to supply parts of or the entire on-board power network and/or the electrical propulsion systems or auxiliary electrical propulsion systems of the watercraft 6. As a rule, the typical charging capacity is in the range of upwards of a few kilowatts.

The power supply unit 10 serves to transform the electrical energy supplied by the commercial power supply 8 for supplying the first coil 12 in order to inductively transmit electrical energy to the secondary coil 13 by known means. If necessary, the power supply unit 10 can also be connected directly to the power grid without interconnection to the commercial power supply 8, in which case the electrical energy provided from the power grid must be transformed for supplying the first coil 12.

To achieve the best possible inductive coupling and thus energy transmission between the primary coil 12 and the secondary coil 13, the coils are aligned with each other as well as possible in the direction of the keel of the watercraft 6, on the one hand, and in the horizontal transverse direction thereto, on the other. A mechanical and/or sensor-based positioning device can be advantageously used for this purpose.

To further improve the inductive coupling between the primary coil 12 and the secondary coil 13 and also to position the primary coil 12 in the height direction H as independently as possible of the level of the water surface 3, a height adjustment device 20 is provided. For this purpose, the height adjustment device 20 has a float 21 which is fixedly attached to the protective housing 16 by means of a connecting element 22. The float 21 can be a known buoyant object made, for example, from a material capable of floating itself, or a hollow body preferably filled with air and/or a lightweight solid, e.g., a preferably closed-pore synthetic foam material.

In cooperation with the height-adjustable mounting device of the protective housing 16 by means of the roller arrangement 18 and the linear guide 19, the float 21 maintains the protective housing 16 and thus the primary coil 12 at a constant distance from the water surface 3 and thus from the secondary coil 13, since this secondary coil, together with the watercraft 6, is always maintained at essentially the same distance from the water surface 3.

To compensate for different loading conditions of the watercraft 6, which affect the loaded draft and thus the vertical distance of the secondary coil 13 from the water surface 3, the secondary coil 13 can also be arranged in a height-adjustable manner on or in the hull 7.

Alternatively or in addition thereto, the primary coil 12 also can also be arranged on the protective housing 16 in a height-adjustable manner. Thus, for example, the connecting element 22 can advantageously be designed to be adjustable in length: for example, it can consist of two telescopically connected parts which can increase or decrease the distance between the float 21 and the protective housing 16 by means of a motor. This can be advantageously achieved by means of a corresponding signal from the watercraft 6, thereby causing the adjustable connecting element 22 and/or the charging system to be controlled accordingly. If the loading of the watercraft 6 is substantial, which entails a larger than normal draft, the length of the connecting element 22 is increased in order to compensate therefor. If, on the other hand, the loading is low, which entails a smaller than normal draft, the length of the connecting element 22 is decreased so that the protective housing 16, together with the primary coil 12 disposed thereon, is held higher up. This can be particularly advantageous for cargo ships, for example, for container ships, where the draft can change significantly during the course of unloading or loading.

An alternative or additional solution can provide that the buoyancy characteristics of the float 21 be changed, for example, by filling hollow spaces in the float 21 which are filled with air, with water, especially water from the surrounding body of water 1, which causes the float 21 to have a lower buoyancy and the primary coil 12 to be lowered downwardly. Preferably, the water taken in in this manner can then be pumped out of the float 21 and replaced with ambient air so that the float 21 gains greater buoyance and, together with the primary coil 12, is lifted upwardly. If necessary, the buoyancy characteristics of the float 21 can also be adjusted by changing the geometry of the float.

It is understood that, given a suitably designed charging system, it suffices if only the primary coil 12 is disposed on the docking place or the shore 4 so as to be adjustable in height and thus can be maintained at a constant distance from the water surface 3 by means of the height adjustment device 20. If, for example, the power supply unit 10 as well is stationarily disposed on the docking place 4 on the shore 4 or underwater, it suffices to position the primary coil 12 by means of the mounting frame 14 on the docking place 4 so as to be height-adjustable. If necessary, the coil 12 and the protective housing 16 in the arrangement shown in FIG. 1 or only the primary coil 12 can also be positioned in a different area of the body of water 1, for example, on a mooring post disposed on the bed 2 of the body of water.

As an alternative or in addition thereto, the inclination of the primary coil 12 can also be adjustable so as to be better adapted to different inclinations of the hull 7. This can optionally be achieved by the transmission of a corresponding signal from the watercraft 6 to the control of the primary coil 12 or by an inclination adjustment device of the primary coil 12 so that the primary coil 12 can be adjusted from the outset with respect to the inclination of the secondary coil 13 of the approaching watercraft 6.

According to a further refinement of the invention, instead of the float 21 being disposed above the protective housing 16, it is possible for the protective housing 16 and/or the power supply unit 10 itself to serve as a float. In this case, the resulting buoyant force must be adjusted to ensure that the primary coil 12 is maintained at such a vertical distance from the water surface 3 that a favorable coupling position of the primary coil with the secondary coil 13 on the watercraft 6 with respect to the distance from the water level is achieved. This is readily possible when the watercraft 6 have hulls 7 of identical design.

Figure 2:
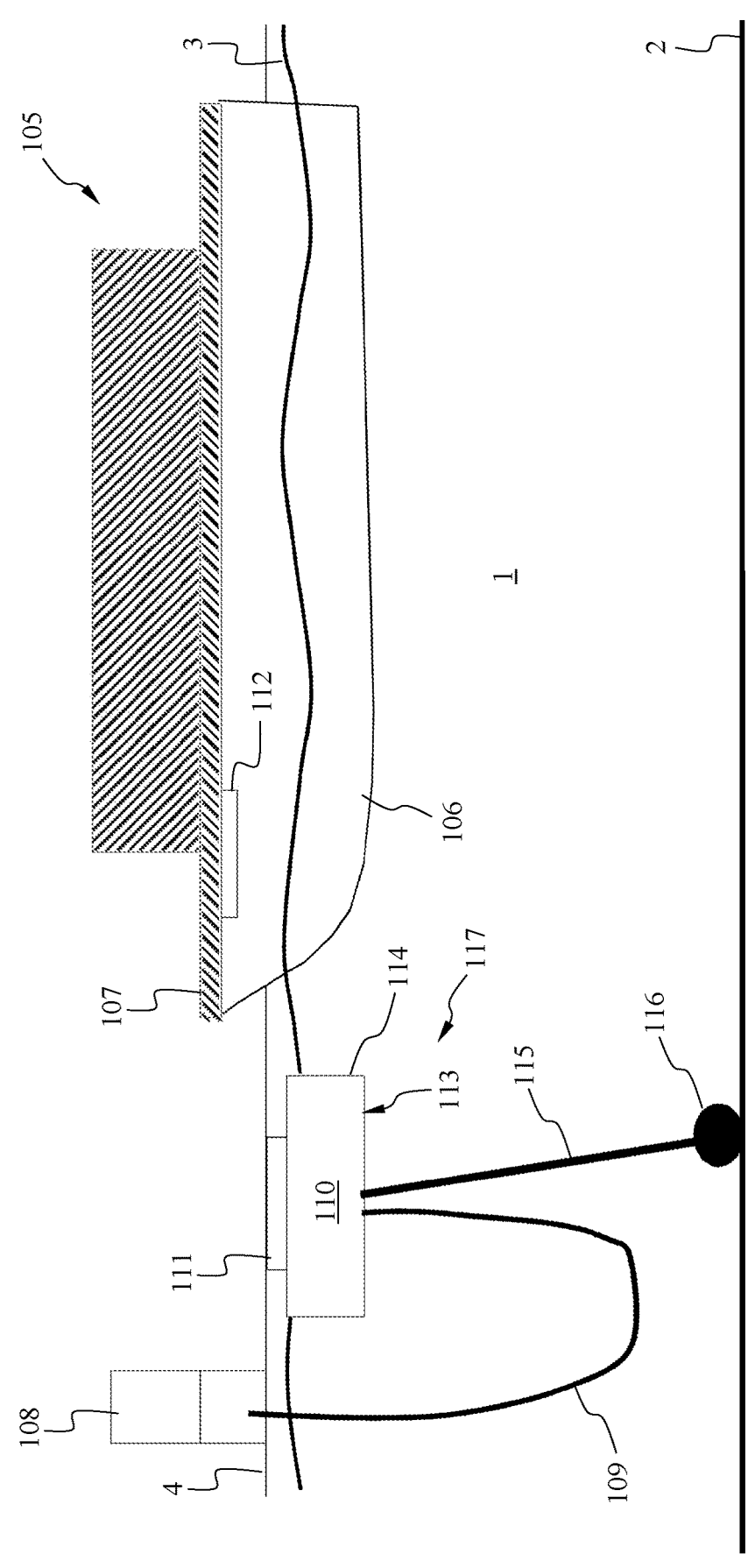
FIG. 2 a diagrammatic side view of an alternative charging system according to the invention with an alternative device according to the invention for inductively transmitting electrical energy between a charging station and a watercraft that can be moved relative to the shore before docking the watercraft at the charging station.
Figure 3:
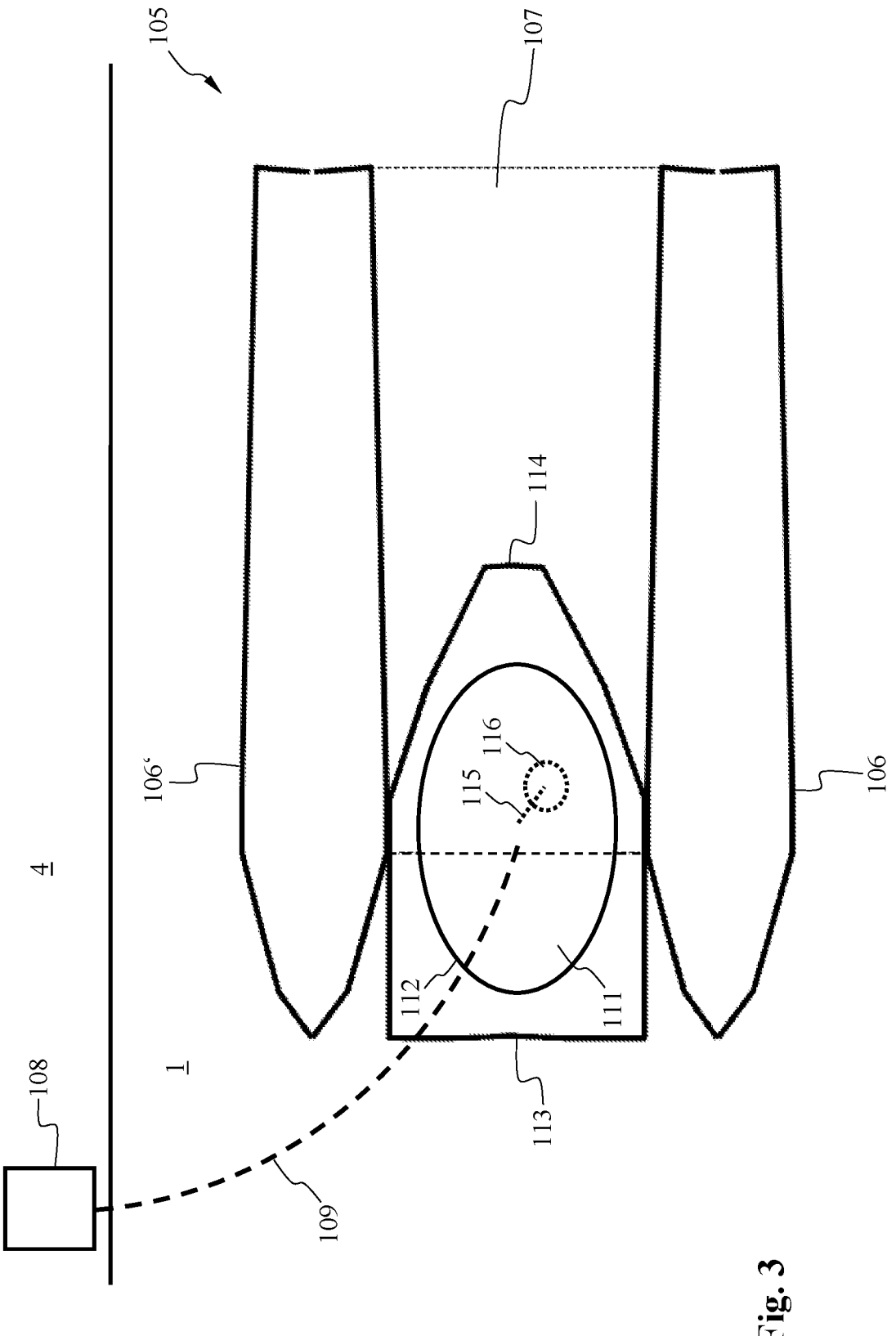
FIG. 3 a plan view of the charging system of FIG. 2 from above, with the watercraft docked at the charging station.

Major components of the alternative charging system according to the invention shown in FIGS. 2 and 3 correspond to those of the embodiment example shown in FIG. 1, and therefore the following description will focus mainly on the differences. Unless otherwise indicated, the above statements apply mutatis mutandis to identical or corresponding components.

In the embodiment example shown in particular in FIG. 2, a charging system according to the invention is again arranged on the shore 4 of the body of water 1, which system includes a commercial power supply 108. By means of a power supply cable 109, the commercial power supply 108 supplies a power supply unit 110 and a primary coil 111 associated with this unit with electrical energy. A motor-driven watercraft 105 is supplied with electrical energy via a secondary coil 112. Thus far, the aforementioned and presently described configurations are identical.

In contrast, however, the power supply unit 110 in the present case is disposed in a float 113, or the power supply unit itself serves as the float 113 so that the primary coil 111 is preferably disposed slightly above the water surface 3. As in the above-described example, using a float 113 allows the primary coil 111 to be maintained at a vertical distance favorable for inductive coupling to the secondary coil 112, which vertical distance adjusts itself to the level of the water surface 3.

The watercraft 105 in this case is a catamaran with two hulls 106, 106 of identical design which are connected by a shipboard 107. In the position shortly before docking as shown in FIG. 2, the watercraft 105 is moving toward a wedge-shaped bow 114 of the float 113, which facilitates the lateral and longitudinal alignment of the primary coil 111 and the secondary coil 112 of the watercraft 105. In FIG. 3, the coupling position, in which the primary coil 111 and the secondary coil 112 directly overlap, is shown from above. However, instead of a catamaran hull, differently designed hull shapes can be used as well.

To be able to further influence the vertical distance between the primary coil 111 and the water surface 3 or the secondary coil 112, for example, for a draft that changes when the watercraft 105 is being unloaded or loaded, a tensioning element 115 shown in FIG. 2 is configured in such a way that it is attached to the power supply unit 110 or the float 113, on the one hand, and by means of a reel-in device 116 to the bed 2 of the body of water, on the other. The rewinding device 116 continuously reels in the tensioning element 115, which is preferably a rope, a steel wire rope or a hawser, in order to maintain the float 113 in the most vertical possible position above the rewinding device 116.

The rewinding device 116 can be adjusted or is made to be sufficiently yielding, preferably elastically yielding, so that when the watercraft 105 is started up, or in the event of water currents, etc., or when the level of the water surface 3 changes, the float 113 is pulled along without markedly changing its height position.

However, in order to be able to adjust the vertical distance between the primary coil 111 and the water surface 3 or the secondary coil 112 when the draft changes or when different watercraft 105 with different drafts are involved, the rewinding device 116 can adjust the length of the tensioning element 115 by means of a motor, both by paying out or reeling in said tensioning element, and thus make it possible to adjust the height of the primary coil 111 and its distance from the secondary coil 112.

As already described above, alternatively or additionally, it is possible to change the buoyancy characteristics of the float 113, for example, by allowing water from the body of water to enter the hollow spaces of the float 113 or by emptying these hollow space by means of a pump.

LIST OF REFERENCE CHARACTERS

1 Body of water
2 Bed of the body of water
3 Water surface
4 Shore, docking place
5 Fortified shore wall
6 Watercraft, ferry
7 Hull
8 Commercial power supply
9 Power supply cable
10 Power supply unit
15 Charging cable
12 Primary coil
13 Secondary coil
14 Mounting frame for the coils
11 Side wall
16 Protective housing
17 Upper cover
18 Roller arrangement
19 Drive rail, linear drive, height-adjustable mount
20 Height adjustment device
21 Float
22 Connecting element
105 Watercraft, ferry
106, 106' Hull
107 Shipboard
108 Commercial power supply
109 Power supply cable
110 Power supply unit
111 Primary coil
112 Secondary coil
113 Float
114 Wedge-shaped bow of the float 115 Tensioning element, hawser
116 Rewinding device
117 Height adjustment device
H Height direction

The invention claimed is:

1. A device for inductively transmitting electrical energy between a power supply unit arranged on a shore of a body of water or in the body of water and a watercraft that is movable relative to the shore, the device comprising at least one primary coil associated with the power supply unit and arrangeable on or in the body of water, at least one secondary coil arrangeable on the watercraft and operatively connectable to the at least one primary coil for inductively transmitting electrical energy, a height adjustment device connected to the at least one primary coil and configured for maintaining the at least one primary coil at a constant vertical distance from a water surface in a height direction extending in a direction of buoyancy, and an inclination adjustment device configured for adjusting inclination of the at least one primary coil.

2. The device as in claim 1, wherein the vertical distance between the water surface and the at least one primary coil is adjustable by use of the height adjustment device.

3. The device as in claim 1, wherein the height adjustment device includes a floating body connected to the at least one primary coil.

4. The device as in claim 3, wherein a distance between the floating body and the at least one primary coil is adjustable in the height direction.

5. The device as in claim 4, further comprising a connecting element configured for connecting the floating body to the at least one primary coil, wherein a length of the connecting element is adjustable in the height direction.

6. The device as in claim 3, wherein buoyancy characteristics of the floating body are variable.

7. The device as in claim 3, wherein the floating body is connectable to a bottom of the body of water or to the shore of the body of water by a tensioning element.

8. The device as in claim 7, wherein the tensioning element is adjustable in length.

9. The device as in claim 7, further comprising a retraction device configured for extending and retracting the tensioning element.

10. The device as in claim 1, wherein the at least one primary coil is movably mounted on the shore of the body of water by a mounting device such that the at least one primary coil is movable in the height direction.

11. A method for inductively transmitting electrical energy between the at least one primary coil and the at least one secondary coil using the device of claim 1, the method comprising:
   aligning the at least one primary coil and the at least one secondary coil with respect to each other,
   previously to or simultaneously with aligning, adjusting a vertical distance between the at least one primary coil and the water surface using the height adjustment device,
   adjusting inclination of the at least one primary coil using the inclination adjustment device, and
   inductively transmitting electrical energy between the at least one primary coil and the at least one secondary coil.

12. The method as in claim 11, wherein the adjusting of the vertical distance between the at least one primary coil and the water surface is carried out as a function of a draft of the watercraft.

13. The method as in claim 12, wherein if the draft of the watercraft changes, the vertical distance of the at least one primary coil from the water surface is adapted to a change in the draft by using the height adjustment device.

14. A charging system comprising the device as in claim 1, a floating body associated with the height adjustment device and connected to the at least one primary coil, and a tensioning element having an adjustable length and configured for connecting the floating body to a bottom of the body of water or to the shore of the body of water.

15. A charging system having a device for inductively transmitting electrical energy between a power supply unit arranged on a shore of a body of water or in the body of water and a watercraft that is moveable relative to the shore, the charging system comprising at least one primary coil associated with the power supply unit and arrangeable on or in the body of water, at least one secondary coil arrangeable on the watercraft and operatively connected to the at least one primary coil for inductively transmitting the electrical energy a height adjustment device connected to the at least one primary coil and configured for maintaining the at least one primary coil at a constant vertical distance from a water surface in a height direction extending in a direction of the buoyancy, and an inclination adjustment device configured for adjusting inclination of the at least one primary coil.

* * * * *